United States Patent [19]
LaCava

[11] Patent Number: 5,079,967
[45] Date of Patent: Jan. 14, 1992

[54] PINCH SELF-ADJUST CONTROL

[75] Inventor: James E. LaCava, Novi, Mich.

[73] Assignee: Teleflex Incorporated, Limerick, Pa.

[21] Appl. No.: 405,756

[22] Filed: Sep. 11, 1989

[51] Int. Cl.⁵ .................................................. F16C 1/10
[52] U.S. Cl. .................................. 74/501.5 R; 74/502; 74/74; 74/531
[58] Field of Search ............... 74/500.5, 502, 503, 74/501.5 R, 501.6, 502.4, 502.6, 531; 188/196 B, 2 D, 24.11, 1.12; 192/111 A, 111 R, 111 T, 111 B

[56] References Cited

U.S. PATENT DOCUMENTS

| | | | |
|---|---|---|---|
| 3,587,341 | 6/1971 | Fiddler | 74/502 |
| 3,789,967 | 2/1974 | Dau et al. | 192/111 A |
| 4,418,383 | 12/1983 | Taig | 192/111 B X |
| 4,611,502 | 9/1986 | Gregory | 74/502 |
| 4,669,330 | 6/1987 | Stocker | 192/111 T X |
| 4,798,098 | 1/1989 | Keller et al. | 74/501.5 R |
| 4,841,805 | 6/1989 | Italiano | 74/501.5 R |

FOREIGN PATENT DOCUMENTS 2590338  5/1987  France ............................ 74/501.5 R Primary Examiner—Vinh T. Luong
Attorney, Agent, or Firm—Reising, Ethington, Barnard, Perry & Milton

[57] ABSTRACT

A motion transmitting remote control assembly (10, 10') including a conduit (12), and a motion transmitting core element (14) movably supported by the conduit (12). An adjustment device (18, 18'), comprising first (20, 20') and second (22) members, is provided for adjusting the effective length of the core element (14). The first member (20, 20') and the second member (22, 22') include coacting ratcheting teeth (36, 38) to limit relative motion between the first (20, 20') and second (22, 22') members to one direction. The first (20, 20') and second (22, 22') members have elliptical cross sections with the first member (20, 20') being molded of a rigid organic polymeric material. The second member (22, 22') is molded of a resilient organic polymeric material for deforming inwardly along its major diameter in response to a pinching force applied thereto, and outwardly along its minor diameter to disengage the ratcheting teeth (36, 38) allowing relative longitudinal movement in both directions. Upon removal of the force, the second member (22, 22') returns to locking engagement with the first member (20, 20').

21 Claims, 1 Drawing Sheet

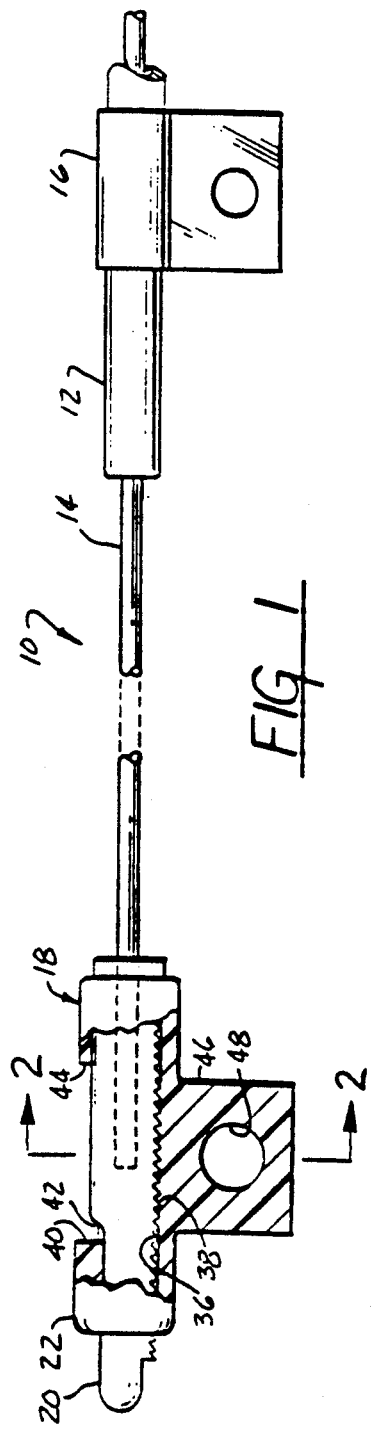
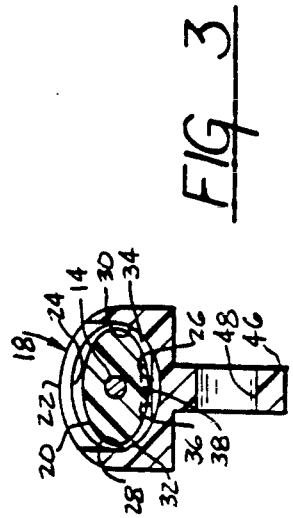
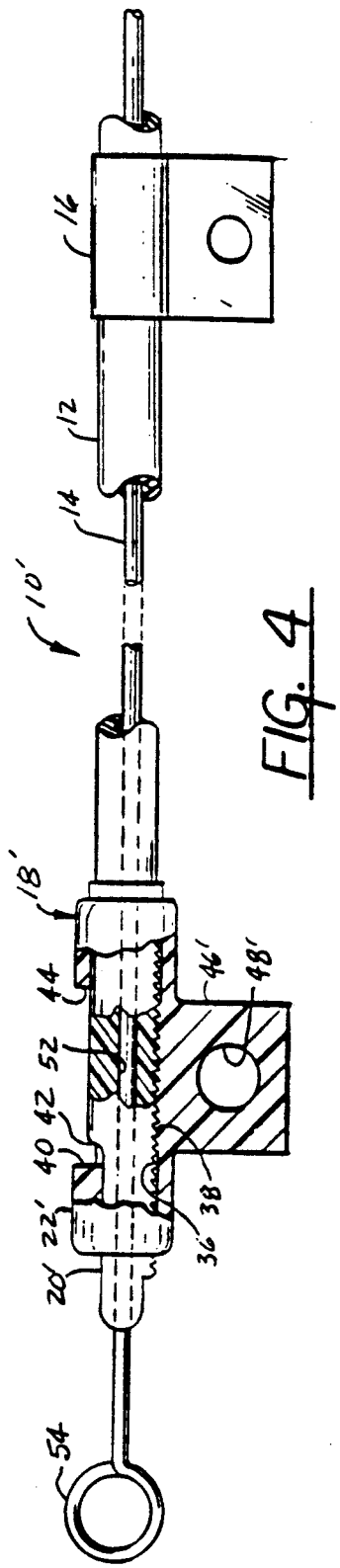

PINCH SELF-ADJUST CONTROL

CROSS REFERENCE TO RELATED APPLICATIONS

The subject invention relates, in part, to U.S. Ser. No. 835,097, filed Feb. 28, 1986, now abandoned.

BACKGROUND OF THE INVENTION

1. Field of the Invention

The subject invention relates to a motion transmitting remote control assembly of the type for transmitting forces along a curved path by a flexible motion transmitting core element moveably supported by a flexible conduit.

2. Description of the Related Art

Remote control assemblies of the instant type are utilized in aircraft, automotive and marine environments. Typical of the use of such a remote control assemblies is the positioning of heater and vent control members in automobiles.

In such applications, it is frequently desirable to adjust the length or position of the end of the core element once the assembly has been installed. Such assemblies normally include one or more fittings secured to the conduit for attaching the conduit to a support structure of the automobile, and the core element is adapted at one end to be attached to a member to be controlled whereas the other end has a manually graspable knob secured thereto for longitudinally moving the core element. Frequently after the assembly has been installed, the member to be controlled may be moved to its extreme position by the end of the core element connected thereto, yet the control knob is not at an extreme position. There are assemblies known to the prior art directed to the solution of this problem, as for example, those shown in U.S. Pat. No. 3,665,784 to Bennett, issued May 30, 1972 and U.S. Ser. No. 835,097, referenced above both of which are assigned to the assignee of the present invention. These assemblies include adjustment means attached to the core element for adjusting the effective length of the core element in response to a predetermined force.

An alternative solution to the problem of adjusting the amount that the core element extends from the end of the conduit is to adjust the effective conduit length. For example, if the core element extends from the conduit too far, its position may be adjusted by lengthening the path over which it must travel. This may be accomplished by lengthening the conduit between the positions at which it is attached to the support structure. Prior art assemblies of this type are shown in U.S. Pat. No. 3,710,645, to Fiddler, issued June 28, 1971 assigned to the assignee of the present invention, and U.S. Pat. Nos. 3,587,341 and 4,693,137 to Deligny, issued Sept. 15, 1987.

SUMMARY OF THE INVENTION AND ADVANTAGES

According to the present invention, there is provided a motion transmitting remote control assembly of the type for transmitting forces along a curved path by a motion transmitting core element. The assembly comprises a conduit and a motion transmitting core element moveably supported by the conduit. An adjustment means is provided for adjusting the relative length of one of the conduit and the core element. The adjustment means includes a second member disposed in locking engagement about a first member. The first and second members each have a peripheral measure circumscribing a respective cross-sectional area. The assembly is characterized by the adjustment means including disengaging means for changing the cross-sectional area of one of the first and second members while continuously maintaining its peripheral measure to disengage the first and second members to allow relative longitudinal movement therebetween.

Accordingly, the advantages of the present invention are to provide a remote control assembly including a compact adjustment means comprising first and second members for adjusting the relative length of one of the conduit and core element and locking them in the adjusted position. The adjustment means of the present invention is durable, simply designed and easy to manufacture and includes disengaging means for quickly and easily unlocking the adjustment means to allow readjustment and/or to accommodate removal of the remote control assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view partially broken away and in cross section of a preferred embodiment of the subject invention for adjusting the length of the core element relative to the conduit;

FIG. 2 is a cross-sectional view taken substantially along line 2—2 of FIG. 1 showing the first and second members of the adjustment means in locking engagement;

FIG. 3 is a cross-sectional view like FIG. 2 taken substantially along line 3—3 of FIG. 1 showing first and second members of the adjustment means out of locking engagement; and FIG. 4 is a view of an alternative embodiment of the subject invention shown partially broken away and in cross section for adjusting the length of the conduit relative to the core element.

DETAILED DESCRIPTION OF THE DRAWINGS

Referring now to the drawings, a first preferred embodiment of a motion transmitting remote control assembly made in accordance with the instant invention is generally show at 10 in FIGS. 1-3 while a second preferred embodiment is shown at 10' in FIG. 4.

Both embodiments include a conduit 12 and a motion transmitting core element 14 movably supported by the conduit 12. The conduit 12 includes an end fitting 16 disposed thereon for securing the conduit 12 to a support structure (not shown). The conduit 12 is preferably of the type including an inner tubular member made of an organic polymeric material and surrounded by a plurality of long lay wires disposed helically thereabout with a casing of organic polymeric material disposed about the long lay wires and the inner tubular member. Additionally, the end fitting 16 is preferably molded of organic polymeric material.

The embodiments 10, 10' include adjustment means 18, 18' for adjusting the length of one of the conduit 12 and core element 14 relative to the other. In other words, the adjustment means 18, 18' may be attached to the core element 14 to adjust the length of the core element 14 relative to the conduit 12 or, alternatively, attached to the conduit 12 to adjust the length of the conduit 12 relative to the core element 14 as will be discussed in further detail with particular reference to the first and second embodiments hereinafter wherein primed numbers are used to represent like parts throughout the embodiments.

With reference to the first embodiment 10, the adjustment means is generally shown at 18 in FIGS. 1-3 and comprises a second member 22 disposed in locking engagement about a first member 20. The first 20 and second 22 members each have a peripheral measure circumscribing a respective cross-sectional area. In the preferred embodiments, the cross-sectional areas of the first 20 and second 22 members are elliptical in shape with coaxially aligned major and perpendicular minor diameters. The minor diameter of the second member 22 presents two engaged portions 24, 26 in locking engagement with the first member 20, whereas the major diameter of the second member 22 presents two disengaged portions 28, 30 separating the engaged portions 24, 26. In this manner, the disengaged portions 28, 30 are spaced from the first member 20 forming opposing cavities 32, 34 therebetween. As will be appreciated, the cross-sectional shapes of the first 20 and second 22 members may take various shapes presenting engaged and disengaged portions, although they are illustrated as being elliptical. One of the two
engaged- portions 24, 26 of the second member 22 include a plurality of one-way ratcheting teeth 36 for correspondingly engaging one-way ratcheting teeth 38 of the first member 20. The coaction of the teeth 36, 38 limits relative motion of the first member 20 and the second member 22 to only one direction. As will be appreciated, the ratcheting teeth 36, 38 may take various forms although they are illustrated as being inclined in one direction and having walls transverse to the longitudinal axis of the core element 14 in the opposite direction to allow the first member 20 to move to the right relative to the second member 22, and to prevent such relative movement in the opposite direction. Of course, the ratcheting teeth 36, 38 may be reversed to allow one-way movement in the opposite direction between the first member 20 and the second member 22.

The adjustment means 18 further includes disengaging means for changing the cross-sectional area of one of the first 20 and second 22 members while maintaining constant peripheral measures of the first 20 and second 22 members to disengage the first 20 and second 22 members to allow relative longitudinal movement therebetween. In the preferred embodiments, the first member 20 is molded of a rigid organic polymeric material having an invariable cross-sectional area, whereas the second member 22 is molded of a resilient organic polymeric material having a changeable cross-sectional area. Thus, when a force is applied to the major diameter of the first member 20 transversely of its longitudinal axis, such as by pinching the second member 22 between the thumb and forefinger, the member 22 deforms in response to such force diminishing the cavities 32, 34 while simultaneously disengaging the engaged portions 24, 26 of the second member 22 to allow relative longitudinal movement between the first 20 and second 22 members. In other words, the pinching force applied inwardly to the disengaged portions 28, 30 toward the first member 20 diminishes the cavities 32, 34 causing the engaged portions 24, 26 to deform outwardly from the first member 20 and disengage from first member 20 while maintaining a constant peripheral measure.

The first member 20 has a portion of reduced diameter on one end forming an outer shoulder 40. The second member 22 includes abutment means 42 comprised of a portion of reduced diameter for abutting the shoulder 40 of the first member 20 to limit the insertion of the first member 20 into the second member 22.

The second member 22 further includes a longitudinally extended slot 44 for providing access to the ratcheting teeth 36 thereof. That is, in the preferred embodiments, the slot 44 is necessary in order to form the ratcheting teeth 36 of the second member 22. As will be appreciated, there may be other ways to form the ratcheting teeth 36 which might not require the slot 44. In view of this, it will be further appreciated that the functioning of the present invention is in no way dependent on the slot 44 except to the extent of providing access to the teeth 36.

The first member 20 of the adjustment means 18 is fixedly secured to and extends from the core element 14. The second member 22 includes a terminal portion 46 having a hole 48 therethrough for attachment to a control member or controlled member or member to be controlled (not shown).

In operation, the remote control assembly 10 is installed by attaching an end fitting such as that shown at 16 to a support structure (not shown) and attaching the terminal portion 46 of the adjustment means 18 to a member to be controlled (not shown) by disposing the member in the hole 48. In many of the assemblies, the opposite end of the core element 14 will have a knob attached thereto for manually longitudinally moving the flexible metal wire-like core element 14. The member to be controlled (not shown) does not offer resistance to movement sufficient to cause relative movement between the first member 20 and the second member 22. However, should the adjustment means 18 be moved to the right, as viewed in FIG. 1, a sufficient distance that the member disposed in the hole 48 is moved to its extreme position to the right and, therefore, bottoms out and can move no further, while the control knob at the other end of the assembly 10 has not fully moved to it extreme right position, a predetermined force may be applied to continually push the knob to the right so that the first member 20 of the adjustment means 18 will move along and relative to the second member 22, thus adjusting the overall effective length of the core element 14. Once this adjustment has been made, the member to be controlled may be moved back and forth without relative movement between the first member 20 and the second member 22 because the forces normally required for such movement of the member to be controlled are not sufficient to cause such relative movement between the first member 20 and the second member 22. Should the need arise to readjust the effective length of the core element 14 in the longitudinal direction opposing that allowed by the ratcheting teeth 36, 38, an inwardly directed pinching force may be applied to the disengaged portions 28, 30 of the second member 22 to deform the second member 22 and simultaneously disengage the engaged portions 24, 26 of the second member 22 from the first member 20, as best shown in FIG. 3, to allow for the desired relative longitudinal movement. Upon removal of the pinching force, the second member 22 returns to locking engagement with the first member 20.

The embodiment 10' illustrated in FIG. 4 differs from the first embodiment 10 in that the first member 20' of the adjustment means 18' is fixedly secured to and extends from the conduit 14 for adjusting the length of the conduit 14 relative to the core element 12. The first member 20' of the second embodiment 10' has a longitudinal passageway 52 therethrough for moveably guiding the core element 12. The second member 22' includes an end fitting 46' disposed thereon with a hole 48' for securing the adjustment means 18' to a support structure (not shown). In all other respects, the embodiment of FIG. 4 is structurally alike and functions the same as the embodiment of FIGS. 1-3.

In operation, the remote control assembly 10' may be installed by attaching the end fitting 46' of the adjustment means 18' to a support structure (not shown) while attaching the end fitting 16 at the other end of the conduit 12 to another support structure (not shown). A loop 54 formed on one end of the core element 14 is connected to a member to be controlled (not shown) with the other end of the core element 14 having a knob attached thereto for manually longitudinally moving the core element 14 as in the first embodiment 10. In a situation where the length of the core element 12 is too long, its effective length may be shortened by increasing the length of its travel path, i.e., increasing the length of the conduit 12. The length of the conduit 12 may be lengthened by pulling the first member 20' to the right as viewed in FIG. 4 until the member to which the loop 54 is attached has moved to its maximum or its extreme position to the right, i.e., has bottomed out to its proper adjusted position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10,10') of the type for transmitting forces along a curved path by a motion transmitting core element, said assembly (10,10') comprising:
   a conduit (12);
   a motion transmitting core element (14) moveably supported by said conduit (12);
   adjustment means (18, 18') for adjusting the length of one of said conduit (12) and said core element (14), said adjustment means (18, 18') comprising a first member (20, 20') and a second member (22, 22') disposed in locking engagement about said first member (20, 20'), said first (20, 20') and said second (22, 22') members each having a peripheral measure circumscribing a respective cross-sectional area, said cross-sectional area of said first member (20, 20') being invariable and said cross-sectional area of said second member (22, 22') being changeable, said second member (22, 22') including engaged portions (24,26) in said locking engagement with said first member (20, 20') and disengaged portions (28,30) separating said engaged portions (24, 26), said disengaged portions spaced from said first member (20, 20') and forming cavities (32,34) therebetween;
   said assembly (10,10') characterized by said disengaged portions (28, 30) being deformable for changing said cross-sectional area of said second member (22, 22') while maintaining constant said peripheral measure of said first (20, 20') and said second (22, 22') members such that said cavities (32,34) are diminished and said engaged portions (24,26) are simultaneously disengaged from said first member (20, 20') for allowing relative longitudinal movement between said first (20, 20') and said second (22, 22') members.

2. An assembly as set forth in claim 1 further characterized by said cross-sectional area of said second member (22, 22') being initially elliptical in shape.

3. An assembly as set forth in claim 2 further characterized by said elliptical cross-sectional area of said second member (22, 22') including a major diameter and a peripheral minor diameter.

4. An assembly as set forth in claim 3 further characterized by said minor diameter of said second member (22, 22') presenting two of said engaging portions (24,26) in said locking engagement with said first member (20, 20').

5. An assembly as set forth in claim 4 further characterized by said one of said two engaging portions (24,26) of said second member (22, 22') comprising one-way ratcheting teeth (36).

6. An assembly as set forth in claim 5 further characterized by said major diameter of said first member (20, 20') presenting two of said disengaged portions (28,30).

7. An assembly as set forth in claim 6 further characterized by said first member (20, 20') including corresponding one-way ratcheting teeth (38) for coacting engagement with said one-way ratcheting teeth (36) of said second member (22, 22') to allow said relative longitudinal movement in only one direction therebetween.

8. An assembly as set forth in claim 7 further characterized by cross-sectional area of said first member (20, 20') being elliptical in shape.

9. An assembly as set forth in claim 8 further characterized by said elliptical cross-sectional area of said first member (20, 20') including a major diameter and a perpendicular minor diameter.

10. An assembly as set forth in claim 9 further characterized by said major and said minor diameters of said first member (20, 20') being coaxial with said major and minor diameters of said second member (22, 22') respectively.

11. An assembly as set forth in claim 10 further characterized by said first member (20) being fixedly secured to said core element (14) for movement therewith.

12. An assembly as set forth in claim 11 further characterized by said second member (22) including a terminal portion (46).

13. An assembly as set forth in claim 12 further characterized by said terminal portion (46) having a hole (48) therethrough for attachment to a control member or controlled member or member to be controlled.

14. An assembly as set forth in claim 10 further characterized by said first member (20') being fixedly secured to said conduit (12).

15. An assembly as set forth in claim 14 further characterized by said first member (20') having a longitudinal passageway (52) therethrough for moveably guiding said core element (14).

16. An assembly as set forth in claim 15 further characterized by said second member (22') having an end fitting (46') having a hole (48') therethrough for securing said adjustment means (18) to a support structure.

17. An assembly as set forth in either of claims 13 or 16 further characterized by said first member (20, 20') including an outer shoulder (40).

18. An assembly as set forth in claim 17 further characterized by said second member (22, 22') including abutment means (42) for abutting said shoulder (40) of said first member (20, 20') to limit the insertion of said first member (20, 20') into said second member (22, 22').

19. An assembly as set forth in claim 18 further characterized by said second member (22, 22') including a longitudinally extended slot (44) for access to said ratcheting teeth (38) thereof.

20. An assembly as set forth in claim 19 further characterized by said conduit (12) including an end fitting (16) disposed thereon for securing said conduit (12) to a support structure.

21. An adjustment mechanism (18, 18') adapted for use with a motion transmitting remote control assembly of the type for transmitting forces along a curved path by a motion transmitting core element, said adjustment mechanism (18, 18') comprising: a first member (20, 20') fabricated of a rigid organic polymeric material and a second member (22, 22') fabricated of a resilient organic polymeric material disposed in locking engagement about said first member (20, 20') along a longitudinal axis for locking engagement therewith, said first member (20, 20') having a predetermined peripheral measure circumscribing an elliptically shaped cross-sectional area whereby the minor diameter of said elliptically shaped cross-sectional area of said second member (22, 22') is in said locking engagement with said first member (20, 20') and the major diameter is spaced from said first member (20, 20') forming cavities (32,34) therebetween, said first (20, 20') and said second (22, 22') members including coacting one-way ratcheting teeth (36,38) for providing said locking engagement therebetween, said second member (22, 22') being deformable in response to force applied transverse to said longitudinal axis to diminish said cavities (32,34) while maintaining constant said peripheral measures of said first (20, 20') and said second (22, 22') members to disengage said second member (22, 22') from said first member (20, 20') to allow said relative longitudinal movement therebetween.

* * * * *